Feb. 6, 1951   R. A. LAUTERBUR ET AL   2,540,586
TAILSTOCK CARRIAGE AND CLAMPING MEANS

Filed Sept. 24, 1947   3 Sheets-Sheet 1

INVENTORS
RAYMOND A. LAUTERBUR
BY CLAUDE S. DOLL

Woodling and Krost
attys

Feb. 6, 1951 R. A. LAUTERBUR ET AL 2,540,586
TAILSTOCK CARRIAGE AND CLAMPING MEANS
Filed Sept. 24, 1947 3 Sheets-Sheet 2

INVENTORS
RAYMOND A. LAUTERBUR
CLAUDE S. DOLL
BY
Woodling and Krost attys

Feb. 6, 1951    R. A. LAUTERBUR ET AL    2,540,586
TAILSTOCK CARRIAGE AND CLAMPING MEANS
Filed Sept. 24, 1947    3 Sheets-Sheet 3
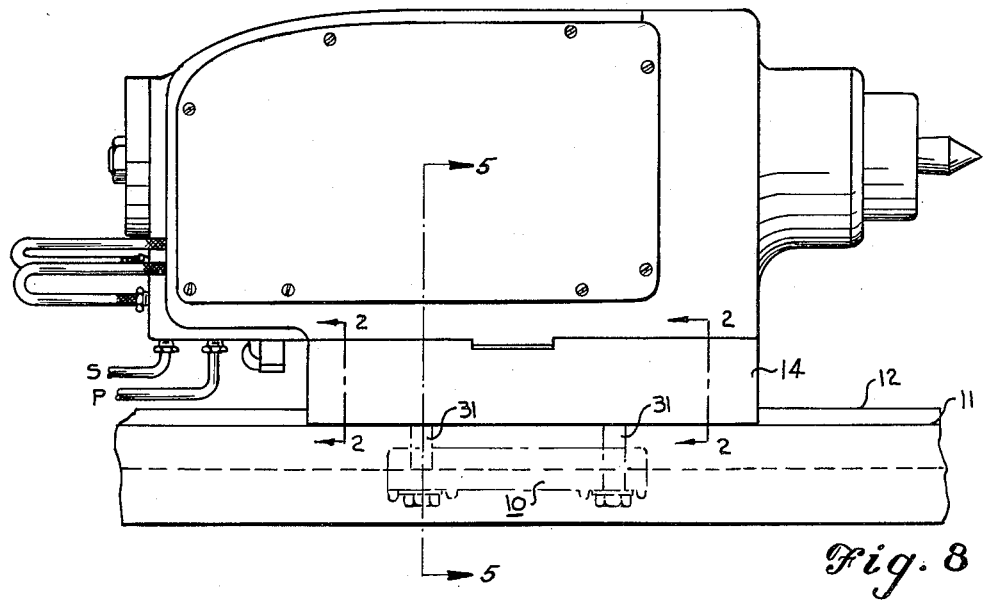
Fig. 8
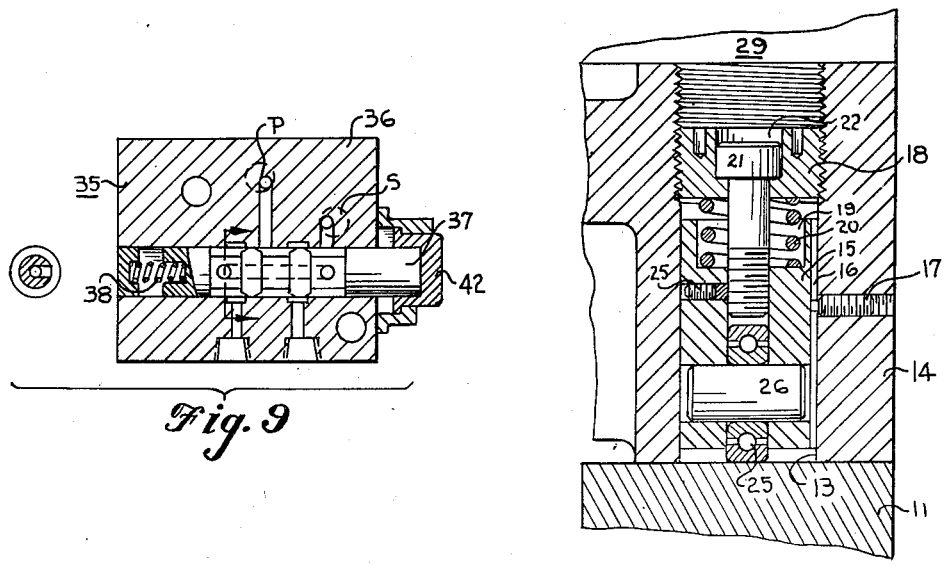
Fig. 9
Fig. 10
INVENTORS
RAYMOND A. LAUTERBUR
CLAUDE S. DOLL
BY Woodling and Krost attys Patented Feb. 6, 1951

2,540,586

UNITED STATES PATENT OFFICE 2,540,586

TAILSTOCK CARRIAGE AND CLAMPING MEANS

Raymond A. Lauterbur and Claude S. Doll, Sidney, Ohio, assignors to The Monarch Machine Tool Company, a corporation of Ohio Application September 24, 1947, Serial No. 775,936

6 Claims. (Cl. 82—31)

The invention relates to machine tools in general and more particularly to a roller carriage and clamp means for the tailstock of the lathe.

The device may be employed with any device which is repositionable upon a track relative to another member, but it finds particular utility in use with the tailstock of a lathe An object of the invention is to provide carriage and lock means for a device which is repositionable upon a track relative to another member.

A more specific object of the invention is to provide a carriage for the tailstock of a lathe.

A further specific object of the invention is to provide a power-actuated lock clamp for the tailstock of a lathe.

A still further object of the invention is to provide a carriage and lock clamp for the tailstock of a lathe, the carriage being operable to support the tailstock for free rolling movement, and the operation of the clamp serving to allow the tailstock to seat upon the ways of the lathe and clampingly hold the tailstock locked in a selected position.

Another object of the invention is to provide a two-way fluid piston or power actuator to draw an interlocking plate member into tight engagement with the bed of the lathe which serves as an anchorage means to pull the tailstock into engagement with the ways of the lathe against the urge of a resilient mounting to lockingly hold the tailstock in a fixed position.

Other objects and a fuller understanding of the invention may be had by referring to the following description and claims, taken in conjunction with the accompanying drawings, in which:

Figure 8 is a side elevational view of the tailstock on the side opposite Figure 1;

Figure 9 is a detail of the actual valve construction employed to direct fluid to the lock mechanism; and Figure 10 is a sectional view along line 10—10 of Figure 1.

Figure 1:
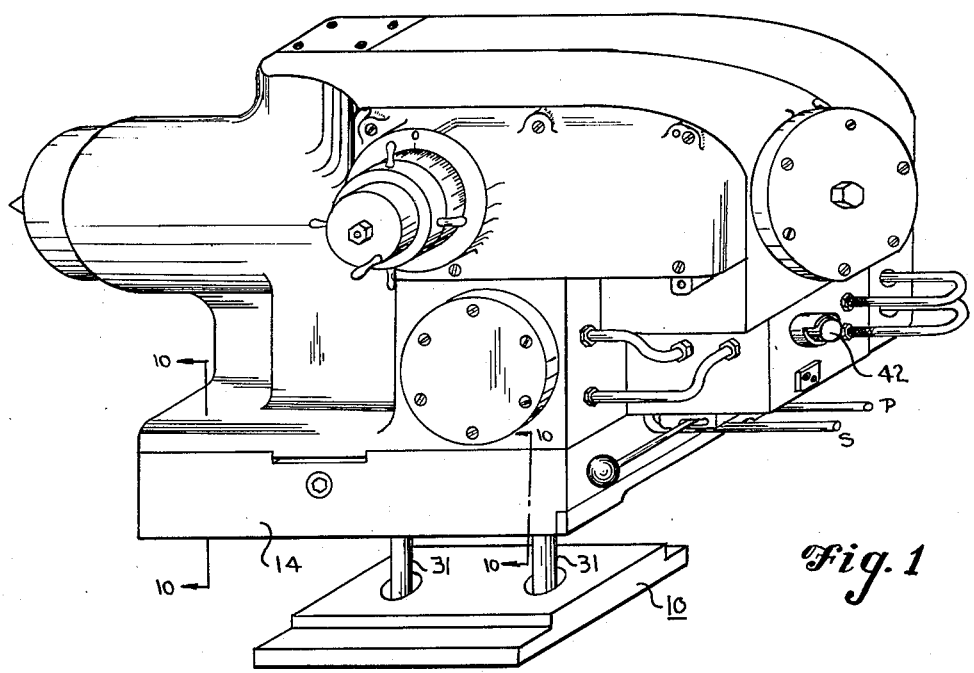
Figure 1 is a perspective view of a tailstock for a lathe, employing the principles of the invention.

In the Figure 1 of the drawing, a tailstock for a lathe is illustrated. This particular tailstock is a power-actuated tailstock, but the present invention may be employed with any tailstock device, or other apparatus adapted to move intermittently upon a track, and to be securely held in a selected position for a period of time between movements. The tailstock of a lathe, of course, is positioned according to the length of the workpiece in the lathe, and may remain at that particular position for only a short period of time, or may remain in that position for days at a time. Nevertheless, when the length of the workpiece is to be changed, the position of the tailstock must be changed. In general practice, the tailstock is provided with well-greased surfaces to ride upon the ways of the lathes. The tailstock is positioned relative to the ways by hand power of the operator. In large lathes, of course, a considerable amount of force is required to move such a tailstock.

In the Figure 1 of the drawings, the ways of the lathe are not illustrated, in order that the depending clamp 10 may be better illustrated. However, in the Figure 8, the ways are illustrated, and the clamp 10 is shown in phantom.

Figures 2, 3:
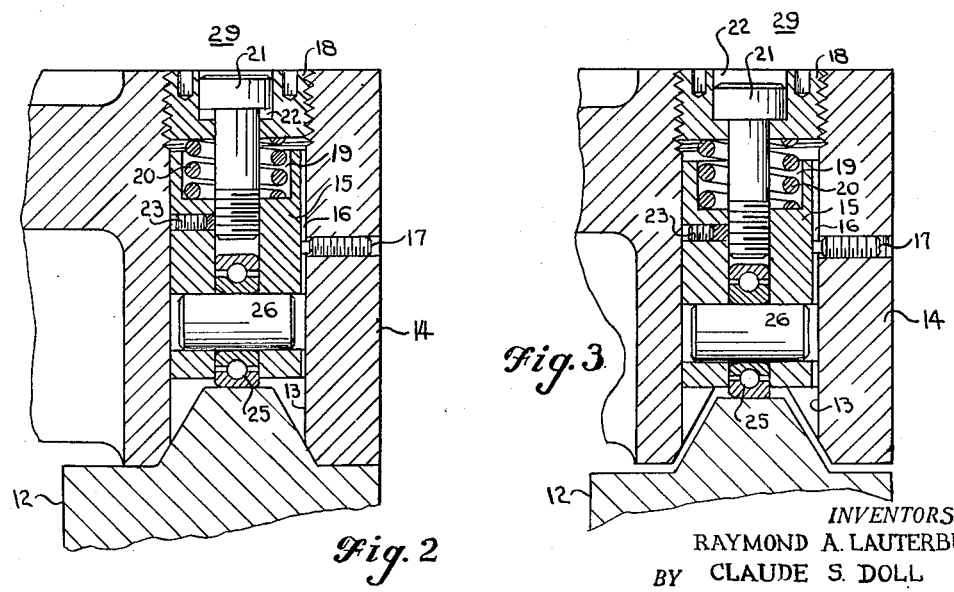
Figure 2 is a sectional view along the line 2—2 of Figure 8, showing the carriage spring compressed to seat the tailstock upon the ways.
Figure 3 is the same sectional view as Figure 2, but with the tailstock supported on the carriage.

The invention includes broadly roller carriage means generally illustrated by the reference character 29 in the Figures 2, 3 and 10 to raise the tailstock free of the ways and provide easy movement of the tailstock upon the ways of the lathe. In the usual construction of the ways, a flat way 11 and a ridged way 12 are used. The ridged way is on the side of the lathe opposite from the position normally occupied by the workman, and is therefore less likely to be damaged by dropping workpieces and tools. The ridged way is provided to hold the tailstock against accidental misalignment with the ways of the lathes. That is, the ways of the lathe serve as a track for the tailstock, and the ridged way 12 provides interlocking surfaces with the tailstock and thereby serves as a guide to keep the tailstock on the track. The roller carriage means 29 comprises the entire assembly of the parts which are mounted in a bore 13 of the bed 14. The invention includes a power-actuated clamp 10 in combination with the roller carriage means 29 to clamp the tailstock into a selected position relative to the ways. In the Figure 1, the sectional line 10—10 is taken through the position of two of the roller carriage means, and these two roller carriage means are illustrated in the Figure 10 of the drawing. In the Figure 8 of the drawing, the sectional lines 2—2 are taken through the position of two more of the roller carriage means on the opposite side of the tailstock bed. These roller carriage means are illustrated in the Figure 2 of the drawing.

In the Figures 2 and 3 of the drawings, as well as the Figure 10, bores 13 are illustrated extending upwardly from the bottom of the bed 14 of the tailstock. There are four such bores 13 and roller carriage means 29 in the illustrated embodiment of the invention, although a larger or smaller number of bores and roller carriage means may be employed for a particular design. One of the improved roller carriage means 29 is adapted to operate in each bore 13, and comprises generally a roller body 15, a ball bearing 25, a bore cap 18 and a coil spring 20. The roller body 15 is held against rotation in the bore 13 by means of a longitudinal slot 16 and an interlocking plug member 17, which is carried by the bed 14.

The bore cap 18 is threadably engaged at the top of the bore 13, and a spring recess 19 is provided in the top of the roller body 15. Therefore, a spring chamber is defined by the spring recess 19 and the lower surface of the bore cap 18. In the spring chamber thus defined, the coil spring 20 is placed. Thus, the spring 20 has a tendency to push the roller body 15 out of the bore 13. However, a cap screw 21 is provided to extend through the bore cap 18 and threadably engage the roller body 15, as illustrated. A recess 22 in the bore cap 18 provides interlocking surfaces with the cap of the screw 21, and therefore prevents the screw from passing through the cap 18. Thus, the spring 20 will be able to move the roller body 15 only as far as the interlocking surfaces between the cap of the screw 21 and the recess 22 will permit. On the other hand, the roller body 15 may be forced into the bore 13 until the top of the body 15 contacts the cap 18. It will therefore be seen, that the roller body 15 has a freedom of slidable movement in the bore 13 of substantially the distance illustrated between the top of the roller body 15 in the Figure 3, and the bottom of the bore cap 18. Of course, the distance which this roller body 15 may slidably move is determined by the distance to which the cap screw 21 is threadably engaged into the roller body 15. Therefore, a soft metal retaining plug 23 is threadably engaged in the roller body 15, and adapted to press against the side wall of the cap screw 21 and hold the cap screw in a selected position.

The lower portion of the roller body 15 is slotted to receive a ball bearing 25. The ball bearing 25 is held in the slotted end of the roller body 15 by means of a cross pin 26. Therefore, the roller body 15, with the ball bearing 25 at the end thereof as illustrated, serves as a roller carriage means for the tailstock.

In the Figures 2 and 10 of the drawings it will be noted that the bed 14 of the tailstock is in tight contact with the ways of the lathe, whereas in Figure 3 the bed 14 is free of the ways, and rests only on the ball bearing 25. The spring 20, when using four roller carriage means, for example, is of substantially greater strength than required to support one-quarter of the weight of the tailstock. Therefore, if no additional weight or holding force is applied to the tailstock, the four springs 20 will press downwardly on the roller body 15 and upwardly on the bed 14, and force the bed 14 free of the ways. Therefore, the tailstock will be supported upon the ball bearings 25 and will be easily shiftable on the ways.

Figure 4:
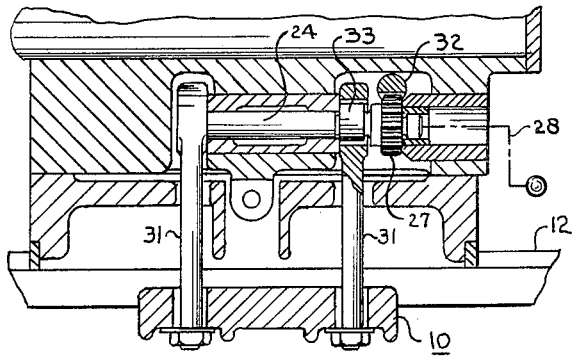
Figure 4 is a sectional view along line 4—4 of Figure 5.
Figure 5:
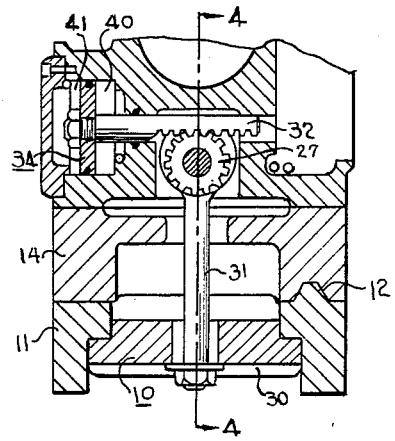
Figure 5 is a sectional view along line 5—5 of Figure 8.

In operation, the tailstock must be tightly clamped in its selected position before it can be used to hold the end of a workpiece. Therefore, the clamp 10 is adapted to depend from the tailstock device and provide interlocking contact with the bed and ways of the lathe. Figures 4 and 5 best illustrate the preferred construction of the clamp 10 for use with the type of tailstock illustrated in the Figure 1.

As best illustrated in the Figure 5, the clamp 10 comprises an interlocking plate member 30 suspended from clamp arms 31. The clamp arms 31 are adapted to be longitudinally reciprocated by means of eccentrics 33 on a rotatable shaft 24. The shaft 24 is rotated by a pinion 27 and driving rack 32. The rack 32 is in turn driven by a two-way fluid piston or power actuator 34. In the Figures 4 and 5, the eccentric 33 has been actuated by the driving rack 32 to pull the plate member 30 tightly into engagement with the bed of the lathe, and draw the tailstock tightly into contact with the ways against the opposition of the springs 20. Thus, the roller bodies 15 are forced upwardly into the bores 13 as illustrated in the Figures 2 and 10, and the bed 14 of the tailstock is in tight clamping contact with the ways 11 and 12. In the Figure 6, however, the rack is illustrated in a position to release the tailstock by moving the plate member 30 downwardly. Thus, the springs 20 are free to support the tailstock upon the ball bearings 25 as illustrated in Figure 3, by forcing the tailstock upwardly and thereby providing a clearance between bed 14 and the ways 11 and 12.

In the preferred embodiment of the invention, the power actuator 34 is adapted to actuate the plate member 30 to clamp the tailstock device in a selected position. Also, in the preferred embodiment, fluid pressure is directed to the power actuator 34 by means of a valve 35. It will be seen in the Figures 6 and 7, that the valve comprises a valve body 36 and a valve member 37 longitudinally reciprocable therein. The valve member 37 is urged longitudinally by a spring 38. Therefore, the valve will generally direct fluid under pressure therethrough as illustrated in the Figure 7 to a chamber 40 of the power actuator 34. Thus, the power actuator 34 will normally actuate the driving rack 32 and the eccentric 33 to pull the clamp arms 31 upwardly and hold the plate member 30 in tight clamping position, and therefore will normally hold the tailstock device locked against longitudinal movement relative to the ways. The flow of fluid through the valve 35 may be followed in the Figure 7 from a source of pressure P through the valve and to the chamber 40. Also, the discharge from the power actuator 34 may be followed by the arrow directions through the valve 35 to a sump indicated by the letter S.

Figure 6:
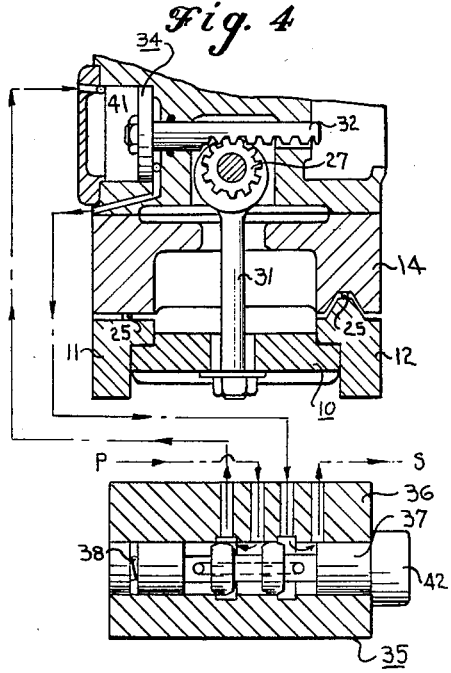
Figure 6 is the same section as Figure 5, with a schematic fluid flow system and valve illustrating the flow of fluid to release the lock.
Figure 7:
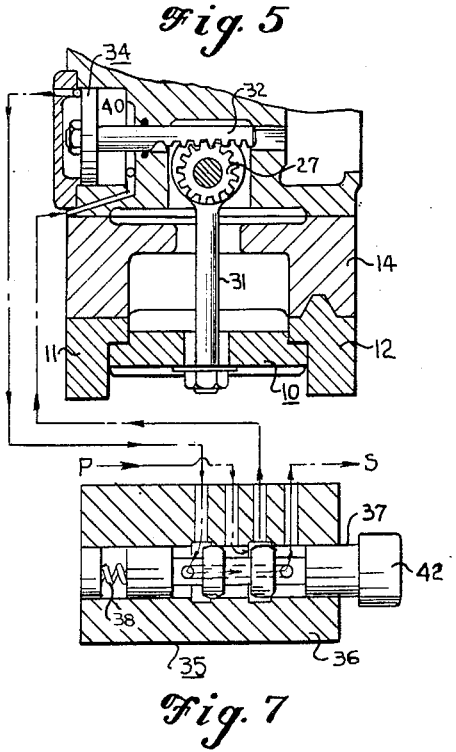
Figure 7 is the same section as Figure 5, with a schematic fluid flow system and valve illustrating the flow of fluid to actuate the lock and hold the tailstock in a fixed position.

When the operator decides to move the tailstock device, he must release the clamping action of the clamp 10 by changing the valving action of the valve 35 to direct the fluid to the chamber 41 of the power actuator 34. A button 42 is adapted to operate the valve member 37, and is illustrated in the Figures 6, 7 and 9. In Figure 1, at the rearward portion of the tailstock, the location of the button 42 may be seen. By pressing inwardly on the button 42, the valving action will be as illustrated in Figure 6 of the drawing, and will direct fluid from the source P through the valve 35 to the chamber 41 of the power actuator 34. Likewise, fluid will be exhausted from the chamber 40 through the valve 35 to the sump indicated by the letter S. Thus, the power actuator 34 will actuate the rack 32 and eccentric 33 to move the arms 31 downwardly and release the plate 30.

In operation, fluid pressure is directed to the chamber 40 and therefore the clamp 10 is interlocked with the bed and ways of the lathe to hold the tailstock device tightly in contact with the ways. This fluid pressure is constant on the power actuator 34, and the tailstock therefore remains in a fixed position. When the operator desires to change the longitudinal position of the tailstock, he needs only to press the button 42 on the valve 35 to move the valving action to the path indicated in the Figure 6. The power actuator 34 thereby releases the clamping action, and permits the springs 20 to support the tailstock upon the ball bearings 25. The operator can then easily move the tailstock on the ball bearings 25 to any desired position. After the tailstock has been moved the desired longitudinal position, the operator simply releases his finger from the button 42, and the valving action is shifted to the position illustrated in Figure 7 by the action of spring 38. The fluid pressure is then directed to the chamber 40 and the plate member 30 is drawn tightly into interlocking engagement with the lathe bed and ways and thereby holds the tailstock downwardly against the force of the spring 20 and clampingly holds the tailstock in the selected position.

At times, for example when the machine is shut down, the fluid pressure from the source P may be discontinued. However, it will be seen that the eccentrics 33 are normally turned to top dead center in order to draw the plate 30 tight, and therefore, even though the power actuator 34 is not under fluid force, the eccentrics 33 will tend to remain in a position to hold the plate 30 tight. That is, force on the arms 31 will not be able to reverse the shaft 24 to release the clamp 10 once the eccentrics have been positioned at the top of the lock cycle to draw the arms 31 tight.

In the Figure 4 of the drawings it will be noted that an opening extends from the right of the bed 14. An actuating pinion 27 to exterior of the bed 14. An actuating lever or crank may be provided to connect directly therewith and provide manual operation of the clamp 10 if the fluid pressure from the source P is not available, or if the clamp 10 is to be operated by manual power. Such lever or crank is illustrated by the dot-dash line 28 in the Figure 4. Of course, the manual operation of the clamp 10 may be used at all times, but it is more desirable, especially in bigger installations, to employ power actuation as illustrated in the preferred embodiment.

This application is related to the copending application of Max De Haas, entitled "Tailstock Actuating Device," application Serial No. 775,873, filed September 24, 1947.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Clamp means for a movable machine element of a machine tool, said clamp means comprising a power actuator having first and second positions, a rack member operable by said power actuator, an eccentric operable by said rack member, a clamp arm operable by said eccentric, and an interlocking plate member carried by said clamp arm to interlockingly engage the machine tool, whereby the power actuator may be actuated to said second position to draw said plate member into tight engagement with said machine tool and thereby pull said machine element to clampingly hold said machine element in a fixed position, said power actuator, rack member and eccentric adapted to transmit motion in one direction from the power actuator to said plate member and adapted not to transmit motion in the opposite direction at least when said power actuator is in said second position.

2. Clamp means for the tailstock of a lathe, said tailstock being adapted to move relative to ways on the bed of the lathe, said clamp means comprising a power actuator having first and second positions, a rack member operable by said power actuator, an eccentric operable by said rack member, a clamp arm operable by said eccentric, and an interlocking plate member carried by said clamp arm to interlockingly engage the bed of the lathe, whereby the power actuator may be actuated to said second position to draw said plate member into tight engagement with said bed of the lathe and thereby pull said tailstock into engagement with said ways, said power actuator, rack member and eccentric adapted to transmit motion in one direction from the power actuator to said plate member and adapted not to transmit motion in the opposite direction at least when said power actuator is in said second position.

3. Clamp means for the tailstock of a lathe, said tailstock being adapted to move relative to ways on the bed of the lathe, said clamp means comprising a power actuator having first and second positions, a rack member operable by said power actuator, an eccentric operable by said rack member, a clamp arm operable by said eccentric, and an interlocking plate member carried by said clamp arm to interlockingly engage the bed of the lathe, whereby the power actuator may be actuated to said second position to draw said plate member into tight engagement with said bed of the lathe and thereby pull said tailstock into engagement with said ways, said eccentric having a dead center position for self-locking, said eccentric being substantially at said dead center position when said power actuator is in said second position to thus lock said tailstock in a clamped condition despite removal of power from said power actuator, and said power actuator being actuable to said first position to release the clamped condition of said tailstock relative to said lathe.

4. Clamp means for the tailstock of a lathe, said tailstock being adapted to move relative to ways on the bed of the lathe, said clamp means comprising a power actuator having first and second positions, a rack member operable by said power actuator, an eccentric operable by said rack member, a clamp arm operable by said eccentric, an interlocking plate member carried by said clamp arm to interlockingly engage the bed of the lathe, whereby the power actuator may be actuated to said second position to draw said plate member into tight engagement with said bed of the lathe and thereby pull said tailstock into engagement with said ways, control means having first and second conditions for selectively causing actuation of said power actuator to first and second positons, respectively, and spring means for normally urging said control means from said first to said second condition to normally actuate said power actuator to said second position and thus clamp said tailstock in a fixed position.

5. Clamp means for the tailstock of a lathe, said tailstock being adapted to move relative to ways on the bed of the lathe, said clamp means comprising a power actuator having first and second positions, a rack member operable by said power actuator, an eccentric operable by said rack member, a clamp arm operable by said eccentric, an interlocking plate member carried by said clamp arm to interlockingly engage the bed of the lathe, whereby the power actuator may be actuated to said second position to draw said plate member into tight engagement with said bed of the lathe and thereby pull said tailstock into engagement with said ways, control means having first and second conditions for selectively causing actuation of said power actuator to first and second positions, respectively, and spring means for normally urging said control means from said first to said second condition to normally actuate said power actuator to said second position and thus clamp said tailstock in a fixed position, said eccentric having a dead center position for self-locking, said eccentric being substantially at said dead center position when said power actuator is in said second position to thus lock said tailstock in a clamped condition despite removal of power to said power actuator, said control means being actuable to said first condition to actuate said power actuator to said first position thus releasing the clamped condition of said tailstock relative to said lathe.

6. Clamp means for the tailstock of a lathe, said tailstock being adapted to move relative to ways on the bed of the lathe, said clamp means comprising a power actuator having first and second positions, a rack member operable by said power actuator, an eccentric operable by said rack member, a clamp arm operable by said eccentric, an interlocking plate member carried by said clamp arm to interlockingly engage the bed of the lathe, whereby the power actuator may be actuated to said second position to draw said plate member into tight engagement with said bed of the lathe and thereby pull said tailstock into engagement with said ways, said power actuator including a fluid motor for driving said rack member, a fluid valve having first and second conditions for selectively causing actuation of said fluid motor to first and second positions, respectively, and spring means in said fluid valve for normally urging said valve from said first to said second condition to normally actuate said fluid motor to said second position and thus clamp said tailstock in a fixed position, said eccentric having a dead center position for self-locking, said eccentric being substantially at said dead center position when said fluid motor is in said second position to thus lock said tailstock in a clamped condition despite failure of fluid pressure, and said fluid valve being actuable to said first condition to actuate said fluid motor to said first position thus releasing the clamped condition of said tailstock relative to said lathe.

RAYMOND A. LAUTERBUR.
CLAUDE S. DOLL.

REFERENCES CITED

The following references are of record in the file of this patent:

UNITED STATES PATENTS

| Number | Name | Date |
|---|---|---|
| 185,682 | Johnson | Dec. 26, 1876 |
| 927,628 | Young | July 13, 1909 |
| 1,381,188 | Gury | June 14, 1921 |
| 1,966,409 | Goelscher | July 10, 1934 |